3,647,799
6,7-DIACYLOXY-TETRAHYDROISOQUINOLINE COMPOUNDS
Toshio Watanabe, Takatsuki-shi, Goro Tsukamoto and Kimiaki Hayashi, Nara-shi, Masanori Sato, Toda-shi, and Yoshio Iwasawa, Urawa-shi, Japan, assignors to Tanabe Seiyaku Co., Ltd., Osaka, Japan
No Drawing. Filed Dec. 4, 1969, Ser. No. 882,296
Claims priority, application Japan, Dec. 10, 1968, 43/90,741
Int. Cl. C07d 35/10
U.S. Cl. 260—286 R                    6 Claims

ABSTRACT OF THE DISCLOSURE

A process for preparing a compound having the formula:

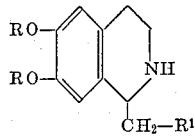

wherein R represents a lower alkanoyl radical and $R^1$ represents a trimethoxyphenyl radical, and pharmaceutically acceptable acid addition salts thereof, which comprises the steps of treating with an acylating agent a 6,7-dihydroxy-tetrahydroisoquinoline compound having the general formula:

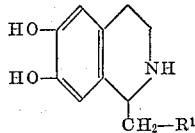

wherein $R^1$ is as described above. The imino radical of said tetrahydroisoquinoline compound is protected either by formation of an acid addition salt or by the addition of a protective group. When the imino radical is protected by a protective group, said group is eliminated after treating.

This invention relates to novel 6,7-diacyloxy-tetrahydroisoquinoline compounds and a process for preparing same. More particularly, it relates to 1-trimethoxybenzyl-6,7-di-lower alkanoyl-1,2,3,4-tetrahydroisoquinoline and the pharmaceutically acceptable acid addition salts thereof.

The compounds may be represented by the following formula:

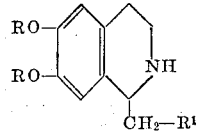

(I)

wherein R represents a lower alkanoyl radical, $R^1$ represents a trimethoxyphenyl radical.

1 - (3,4,5 - trimethoxybenzyl )- 6,7 - dihydroxy-1,2,3,4-tetrahydroisoquinoline and its salt (hereinafter designated as 6,7-dihydroxy-tetrahydroisoquinoline compound) are known as potent β-stimulating agents having therapeutically useful characteristics such as bronchodilating, cardiotonic and hypotensive actions. For example, the hydrochloride of said 6,7-dihydroxy-tetrahydroisoquinoline compound is about five to ten times as strong as isoproterenol sulfate with regard to its preventive and depressive effect against the paroxysm of asthma. (Tetrahedron, Suppl. 8, part I, pp. 129–134.)

However, because of the low absorption thereof from the digestive tracts, the pharmacological actions of the 6,7-dihydroxy-tetrahydroisoquinoline compound, when administered enteraly, are not as potent as those obtained by parenteral administration.

We have found that 6,7-di-lower alkanoyloxy-tetrahydroisoquinoline compounds (I) of this invention have superior pharmacological properties as β-stimulating agents and are particularly suitable for enteral administration. Namely, the compounds (I) of this invention can be readily absorbed from digestive tracts, and at the same time maintain their β-stimulating activity about three to five times as strong as the 6,7-dihydroxy-tetrahydroisoquinoline compound. For example, sublingual administration to an adult male of a buccal tablet containing 0.5 mg. of 1 - (3,4,5-trimethoxybenzyl)-6,7-dibutyryloxy-1,2,3,4-tetrahydroisoquinoline oxalate exhibited approximately the same pharmacological effects as when a buccal tablet containing 3 mg. of the 6,7-dihydroxy-tetrahydroisoquinoline compound was administered.

The 6,7-dialkanoyloxy-tetrahydroisoquinoline compounds (I) are also characterized by their rapid effectiveness. For example, paroxysm of asthma was induced by intravenous administration of 5 μg./kg. of histamine to male cats having a body weight of 2–4 kg. When histamine was administered after the cats were given 10 μg./kg. of 1-(3,4,5-trimethoxybenzyl)-6,7-dibutyryloxy-1,2,3,4 - tetrahydroisoquinoline oxalate by duodenal administration, there was an immediate reduction in the effect of said paroxysm to the extent of 70% within 5 minutes and 85% within 20 minutes. On the other hand, the reduction of the paroxysm by the administration of 6,7-dihydroxy-tetrahydroisoquinoline compound under similar conditions was merely 5% within 5 minutes and the maximum effect (80%) did not appear until after 40 minutes.

The improved absorbability of the 6,7-dialkanoyloxy-tetrahydroisoquinoline compounds is also shown by their hypotensive actions. As shown in Table I, they are three to five times stronger than that of 6,7-dihydroxytetrahydroisoquinoline compound. The compounds shown in Table I were administered duodenally to SD-male rats of 250–300 g. body weight.

TABLE I
Hypotensive activity, mm. Hg

| Compound | Dose (mg./kg.) | | |
|---|---|---|---|
|  | 100 | 300 | 1,000 |
| 1-1-(3,4,5-trimethoxybenzyl)-6,7-dibutyryloxy-1,2,3,4-tetrahydroisoquinoline oxalate | 22 | 34 | |
| 1-1-(3,4,5-trimethoxybenzyl)-6,7-diisobutyryloxy-1,2,3,4-tetrahydroisoquinoline oxalate | 17 | 37 | |
| 1-1-(3,4,5-trimethoxybenzyl)-6,7-diacetyloxy-1,2,3,4-tetrahydroisoquinoline oxalate | 15 | 30 | |
| 1-1-(3,4,5-trimethoxybenzyl)-6,7-dihydroxy-1,2,3,4-tetrahydroisoquinoline oxalate | | 10 | 33 |

The compounds (I) of this invention are also remarkably non-toxic. For example, the $LD_{50}$ in mice of 6,7-dibutyryloxy-tetrahydroisoquinoline compound of this invention, when administered intravenously, was calculated to be more than 120 mg./kg.

According to the present invention, the 6,7-dialkanoyloxy-tetrahydroisoquinoline compound (I) can be prepared by selective acylation of 6,7-dihydroxy groups of the 6,7-dihydroxy-tetrahydroisoquinone compound having the general formula:

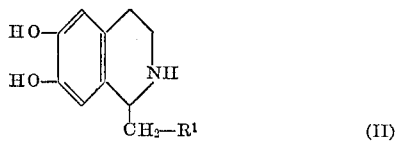

wherein $R^1$ is defined as above, which comprises treating the compound (II) with an acylating agent in a conventional manner while protecting the imino radical of the isoquinoline compound (II) either in the form of an acid addition salt or by introducing a conventional protective group. When the imino radical of the resulting acylated isoquinoline compound is protected by a protective group, said protective group is subsequently eliminated by conventional procedures after the treatment step.

The above-stated processes may be illustrated by the following reaction scheme:

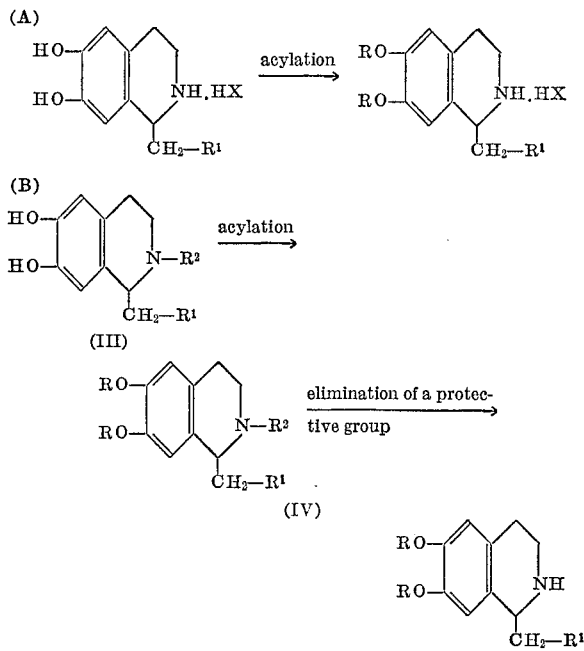

wherein $R^2$ represents a protective group of imino radical, X represents an acid residue, and R and $R^1$ are as defined above.

The 6,7-dihydroxy-tetrahydroisoquinoline compound (II) can be employed as the starting material in both forms of the racemic modification and the optically active form.

The reaction process described as route A, i.e., the direct acylation of an acid addition salt of the isoquinoline compound (II) can be performed by treating the salt with a lower alkanoyl halide (e.g., acetyl halide, propionyl halide, butyryl halide, isobutyryl halide, etc.) in an inert solvent. The starting acid addition salt of the isoquinoline compound (II) can be readily prepared by treating the compound (II) with a suitable acid, such as hydrochloric acid, hydrobromic acid, hydrofluoric acid, nitric acid, sulfuric acid, phosphoric acid or perchloric acid.

It is preferred to carry out the reaction at a temperature between 100° C. and room temperature. The reaction may be completed in a few hours when being carried out at 100° C. Dimethylformamide, chloroform or a fatty acid corresponding to the alkanoyl halide used may be used as the reaction solvent.

Alternatively, the 6,7-diacyloxy-tetrahydroisoquinoline compound (I) can be prepared by the processes described as route B, i.e., by the steps of introducing a protective group into the amino radical of the compound (II), acylating the resultant product (III) to give the 6,7-diacyloxy-tetrahydroisoquinoline compound (IV) in which the imino radical is protected, and eliminating the protective group of the imino radical from the product.

As the protective group of the imino radical, any conventional radical may be used provided it can be selectively eliminated by an appropriate procedure. For example, an acyl group such as benzyloxycarbonyl radical, tosyl radical, mesyl radical, p-nitrosulfinyl radical, tert-amyloxycarbonyl radical or tert-butoxycarbonyl radical may be preferably used for this purpose. The introduction of the protective group into the imino radical of the isoquinoline compound (II) can be performed by treating the compound (II) with an acyl halide corresponding to one of the aforementioned acyl radicals. It is preferred to carry out the reaction in the presence of boric acid at a lower temperature, for example, under ice cooling. Pyridine, dimethylformamide or other bases may be used as the reaction solvent.

The 6,7-dialkanoyloxy-tetrahydroisoquinoline compound (IV), in which the imino radical is protected, can be prepared preferably by treating the resultant isoquinoline compound (III) with acylating agent (e.g., lower alkanoyl halide or acid anhydride) in the presence of alkaline reagent at room temperature. Alkali hydroxide, alkali carbonate, pyridine, triethylamine, etc. may be used as the alkaline reagent.

The reaction may be carried out by allowing the reaction solution to remain at room temperature from several hours to one complete day. The elimination of the protective group of the 6,7-diacyloxy-tetrahydroisoquinoline compound (IV) may be effected by an appropriate procedure depending on the nature of the protective group. Some typical procedures are as follows: catalytic hydrogenation or treatment with hydrogen bromide in acetic acid when benzyloxycarbonyl radical is employed as the protective group; treatment with mineral acid (e.g., hydrochloric acid) at room temperature when tert-butoxycarbonyl, tert-amyloxy-carbonyl, formyl, tosyl or mesyl radical is employed as the protective group.

The 6,7-diacyloxy-tetrahydroisoquinoline compound (I) thus obtained can be employed for pharmaceutical purposes in both forms of bases and their salts, which are readily convertible from one to the other by conventional means. Examples of the preferable therapeutically acceptable salts are salts with inorganic acids, such as hydrochloric acid, hydrobromic acid, perchloric acid, nitric acid, sulfuric acid or phosphoric acid; or organic acids such as formic acid, acetic acid, propionic acid, glycollic acid, lactic acid, pyruvic acid, oxalic acid, malonic acid, succinic acid, maleic acid, fumaric acid, malic acid, citric acid, tartaric acid, ascorbic acid, hydroxymaleic acid, benzoic acid, phenylacetic acid, aminobenzoic acid, methanesulfonic acid, ethanesulfonic acid, benzenesulfonic acid, p-toluene-sulfonic acid, sulfanilic acid, glycine, alanine, aspartic acid or glutamic acid. Furthermore, the 6,7-dialkanoyloxy-tetrahydroisoquinoline compound (I) may be used in the form of pharmaceutical preparations containing them in conjunction or admixture with a pharmaceutical excipient suitable for enteral administration.

Suitable excipients are substances that do not react with 6,7-dialkanoyloxy-tetrahydroisoquinoline compound (I). Among these are included gelatin, lactose, glucose, sodium chloride, starch, magnesium stearate, talcum, vegetable oil, benzyl alcohol, gums or other known medicinal excipients.

The pharmaceutical preparations may be in solid form such as tablets, coated tablets, pills or capsules; or in liquid form such as solutions, suspensions or emulsions. They may be sterilized and/or may contain auxiliaries, such as preserving, stabilizing, wetting or emulsifying agents. They may also contain, in addition, other therapeutically valuable substances.

Practical and presently-preferred embodiments of the present invention are illustratively shown in the following examples.

EXAMPLE 1

0.8 g. of 1-1-(3,4,5-trimethoxybenzyl)-6,7-dihydroxy-1,2,3,4-tetrahydroisoquinoline hydrochloride is suspended in a mixture of 20 ml. of acetic acid and 2.0 g. of acetylchloride. Dry hydrogen chloride gas is introduced into the suspension. The resultant clear solution is allowed to stand overnight at room temperature. The solution is concentrated, until dry, under reduced pressure on a water bath. The residue thus obtained is dissolved in benzene. Water is added to the solution and the solution is neutralized with sodium bicarbonate. The benzene layer is separated and is washed with water, dried and decolorized with activated carbon. The benzene solution is then evaporated to remove solvent whereby 1-1-(3,4,5-trimethoxybenzyl) - 6,7-diacetyloxy-1,2,3,4-tetrahydroisoquinoline is obtained as crude oil. The $R_f$-value of this compound in thin layer chromatography is about 0.4 (Kiesel Gel G nach Stahl, Solvent—chloroform:ethanol=50:1). An ethanol solution containing 250 mg. of oxalic acid is added to the above oil and the crystals precipitated are collected by filtration whereby 0.75 g. of 1-1-(3,4,5-trimethoxybenzyl) - 6,7 - diacetyloxy - 1,2,3,4-tetrahydroisoquinoline oxalate is obtained. M.P. 200° C.

The crystals are recrystallized from methanol to yield colorless needles of the oxalate melting at 202° C.

*Elemental analysis.*—Calculated for $$C_{23}H_{27}O_7N \cdot C_2H_2O_4$$

(percent): C, 57.79; H, 5.62; N, 2.69. Found (percent): C, 57.76; H, 5.69; N, 2.63.

EXAMPLE 2

0.9 g. of dl-1-(3,4,5-trimethoxybenzyl)-6,7-diacetyloxy-1,2,3,4-tetrahydroisoquinoline oxalate is obtained in the same manner as described in Example 1 except that 0.8 g. of dl - 1 - (3,4,5-trimethoxybenzyl)-6,7-dihydroxy-1,2,3,4-tetrahydroisoquinoline hydrochloride is used as the starting material instead of 1-1-(3,4,5-trimethoxybenzyl)-6,7-dihydroxy - 1,2,3,4 - tetrahydroisoquinoline hydrochloride. M.P. 196° C.

*Elemental analysis.*—Calculated for $$C_{23}H_{27}O_7N \cdot C_2H_2O_4$$

(percent): C, 57.79; H, 5.62; N, 2.69. Found (percent): C, 57.40; H, 5.62; N, 2.65.

EXAMPLE 3

0.2 g. of 1-1-(3,4,5-trimethoxybenzyl)-6,7-dihydroxy-1,2,3,4-tetrahydroisoquinoline hydrochloride is added to a mixture of 10 ml. of chloroform and 20 ml. of acetyl chloride. Dry hydrogen chloride gas is introduced into the mixture. After standing overnight at room temperature, the solution is treated in the same manner as in Example 1 to yield 0.17 g. of 1-1-(3,4,5-trimethoxybenzyl)-6,7-diacetyloxy-1,2,3,4-tetrahydroisoquinoline oxalate.

EXAMPLE 4

2.0 g. of 1-1-(3,4,5-trimethoxybenzyl)-6,7-dihydroxy-1,2,3,4-tetrahydroisoquinoline hydrochloride is added to a mixture of 20 ml. of n-butyric acid and 4.6 g. of n-butyryl chloride. After stirring for about 20 hours at room temperature, the mixture is concentrated, until dry, under reduced pressure on a water bath. The residue thus obtained is dissolved in 1 N-hydrochloric acid. The acidic solution is washed with ether and subsequently alkalified with sodium carbonate. The solution is then extracted with ether. The extract is dried and evaporated to remove ether whereby 1.6 g. of 1-1-(3,4,5-trimethoxybenzyl)-6,7-dibutyryloxy-1,2,3,4-tetrahydroisoquinoline is obtained as almost colorless oil. The $R_f$-value of this compound measured in the same manner as in Example 1 is about 0.5. This compound is converted to the oxalate thereof in the same manner as in Example 1 to yield 1.5 g. of 1-1-(3,4,5-trimethoxybenzyl)-6,7-dibutyryloxy-1,2,3,4-tetrahydroisoquinoline oxalate. M.P. 218–219° C.

*Elemental analysis.*—Calculated for $$C_{27}H_{35}O_7N \cdot C_2H_2O_4$$

(percent): C, 60.51; H, 6.48; N, 2.43. Found (percent): C, 60.49; H, 6.51; N, 2.39.

The following salts are prepared by similar procedures as described above:

1-1-(3,4,5-trimethoxybenzyl) - 6,7 - dibutyryloxy-1,2,3,4-tetrahydroisoquinoline tartarate. M.P. 146.5° C.

*Elemental analysis.*—Calculated for $$C_{27}H_{35}O_7N \cdot C_4H_6O_6$$

(percent): C, 58.57; H, 6.50; N, 2.20. Found (percent): C, 58.23; H, 6.44; N, 2.09.

1-1-(3,4,5-trimethoxybenzyl) - 6,7 - dibutyryloxy-1,2,3,4-tetrahydroisoquinoline succinate. M.P. 130–131° C.

*Elemental analysis.*—Calculated for $$C_{27}H_{35}O_7N \cdot C_4H_6O_4$$

(percent): C, 61.68; H, 6.84; N, 2.32. Found (percent): C, 61.75; H, 6.94; N, 2.33.

1-1-(3,4,5-trimethoxybenzyl) - 6,7 - dibutyryloxy-1,2,3,4-tetrahydroisoquinoline maleate. M.P. 111–113° C.

*Elemental analysis.*—Calculated for $$C_{27}H_{35}O_7N \cdot C_4H_4O_4$$

(percent): C, 61.88; H, 6.53; N, 2.32. Found (percent): C, 61.78; H, 6.53; N, 2.21.

EXAMPLE 5

1.8 g. of dl-1-(3,4,5-trimethoxybenzyl)-6,7-dibutyryloxy-1,2,3,4-tetrahydroisoquinoline oxalate is obtained in the same manner as described in Example 4 except that 2.0 g. of dl-1-(3,4,5-trimethoxybenzyl) - 6,7 - dihydroxy-1,2,3,4-tetrahydroisoquinoline hydrochloride is used as the starting material instead of 1-1-(3,4,5-trimethoxybenzyl)-6,7 - dihydroxy-1,2,3,4-tetrahydroisoquinoline hydrochloride. M.P. 200–201° C. (decomp.).

*Elemental analysis.*—Calculated for $$C_{27}H_{35}O_7N \cdot C_2H_2O_4$$

(percent): C, 60.51; H, 6.48; N, 2.43. Found (percent): C, 60.56; H, 6.54; N, 2.23.

EXAMPLE 6

190 mg. of 1-1-(3,4,5-trimethoxybenzyl)-6,7-dihydroxy-1,2,3,4-tetrahydroisoquinoline hydrochloride is dissolved in a mixture of 0.5 ml. of dimethylformamide and 4 ml. of chloroform, and 1 ml. of isobutyryl chloride is added to the solution. The solution is then refluxed for 4 hours by heating while introducing dry hydrogen chloride gas. After the reaction is completed, the solution is concentrated under reduced pressure until dry. The residue thus obtained is dissolved in water. The aqueous solution is neutralized with sodium bicarbonate and extracted with chloroform. The extract is dried and evaporated to remove solvent whereby 1-1-(3,4,5-trimethoxybenzyl)-6,7-diisobutyryloxy-1,2,3,4-tetrahydroisoquinoline oxalate is obtained as crude oil. The $R_f$-value of this compound in the thin layer chromatography is 0.3–0.35 (aluminiumoxide gel, solvent—chloroform). The crude oil is dissolved in a small amount of methanol. Methanol solution containing oxalic acid is added to the solution. The crystals thus precipitated are collected by filtration. Said crystals are then recrystallized from methanol to yield 190 mg. of 1-1-(3,4,5-trimethoxybenzyl)-6,7-diisobutyryloxy-1,2,3,4-tetrahydroisoquinoline oxalate as colorless needles. M.P. 205–207° C. (decomp.).

*Elemental analysis.*—Calculated for $$C_{27}H_{35}O_7N \cdot C_2H_2O_4$$

(percent): C, 60.51; H, 6.48; N, 2.43. Found (percent): C, 60.30; H, 6.49; N, 2.35.

EXAMPLE 7

1.9 g. of dl-1-(3,4,5-trimethoxybenzyl)-6,7-diisobutyryloxy-1,2,3,4-tetrahydroisoquinoline oxalate is obtained in the same manner as described in Example 6 except that 2.0 g. of dl-1-(3,4,5-trimethoxybenzyl) - 6,7 - dihydroxy-1,2,3,4-tetrahydroisoquinoline hydrochloride is used as the starting material instead of 1-1-(3,4,5-trimethoxybenzyl)-6,7-dihydroxy-1,2,3,4-tetrahydroisoquinoline hydrochloride.

*Elemental analysis.*—Calculated for $$C_{27}H_{35}O_7N \cdot C_2H_2O_4$$

(percent): C, 60.51; H, 6.48; N, 2.43. Found (percent): C, 60.51; H, 6.48; N, 2.43.

EXAMPLE 8

1.5 g. of 1-1-(3,4,5-trimethoxybenzyl)-6,7-dihydroxy-1,2,3,4-tetrahydroisoquinoline hydrochloride is dissolved in 60 ml. of aqueous solution containing 0.68 g. of sodium hydroxide and 2.11 g. of boric acid. A solution of 0.75 g. of benzyloxycarbonylchloride in 3 ml. of chloroform is added to the above solution for about 15 minutes under ice cooling. The solution is stirred for 45 minutes and then acidified with concentrated hydrochloric acid. The acidic solution is extracted with ethyl ether. The extract is washed with water, dried and evaporated to remove solvent to yield 1.58 g. of 1-1-(3,4,5-trimethoxybenzyl)-2-benzyloxycarbonyl-6,7-dihydroxy-1,2,3,4-tetrahydroisoquinoline. The infrared spectrum of this compound shows a strong absorption corresponding to amide at the neighborhood of 1670 cm.$^{-1}$.

2.0 g. of this compound is dissolved in 20 ml. of pyridine, and 0.7 g. of acetylchloride is added dropwise to the solution under ice cooling. The solution is allowed to stand for 2 hours at room temperature. The solution is then concentrated under reduced pressure until dry. The residue thus obtained is dissolved in benzene, and the benzene solution is washed successively with cool water, diluted hydrochloric acid and water and then dried. The solution is evaporated under reduced pressure to remove the solvent whereby 2.3 g. of 1-1-(3,4,5-trimethoxybenzyl) - 2-benzyloxycarbonyl-6,7-diacetyloxy-1,2,3,4-tetrahydroisoquinoline is obtained. The infrared spectrum of this compound shows a strong absorption corresponding to ester (C=O) and amide (NCO) at 1700 cm.$^-$ and 1695 cm.$^-$.

2.3 g. of this compound is dissolved in a mixture of 20 ml. of ethanol and 1 ml. of acetic acid. The solution is subjected to catalytic reduction in the presence of 0.7 g. of 20% paradium-carbon. After the reaction is completed, the catalysts are removed by filtration. The filtrate is concentrated under reduced pressure until dry. The residue thus obtained is added to a solution of 0.5 g. of oxalic acid in 5 ml. of methanol. The precipitated crystals are collected by filtration whereby 1.8 g. of 1-1-(3,4,5 - trimethoxybenzyl)-6,7-diacetyloxy-1,2,3,4-tetrahydroisoquinoline oxalate is obtained. The crystals are recrystallized from methanol to yield said oxalate as fine crystals melting at 202–203° C.

*Elemental analysis.*—Calcd. for $C_{23}H_{27}O_7N \cdot C_2H_2O$ (percent): C, 57.79; H, 5.62; N, 2.69. Found (percent): C, 57.60; H, 5.60; N, 2.70.

EXAMPLE 9

2.4 g. of 1-1-(3,4,5-trimethoxybenzyl)-2-benzyloxycarbonyl - 6,7 - dihydroxy-1,2,3,4-tetrahydroisoquinoline is dissolved in 20 ml. of pyridine, and 1.3 g. of isobutyrylchloride is added to the solution under ice cooling. After stirring for a while, the solution is allowed to stand for 3 hours at room temperature. The solution is then treated in the same manner as in Example 5 whereby 2.9 g. of 1 - 1 - (3,4,5-trimethoxybenzyl)-2-benzyloxycarbonyl-6,7-diisobutyryloxy - 1,2,3,4 - tetrahydroisoquinoline is obtained. Said compound is dissolved in 30 ml. of acetic acid saturated with hydrogen bromide. The solution is allowed to stand for an hour at room temperature. The solution is then concentrated under reduced pressure until dry. The residue thus obtained is dissolved in benzene, and the benzene solution is washed successively with aqueous solution of sodium bicarbonate and water and then dried. The solution is evaporated to remove the solvent. The residue is added to a solution of 0.5 g. of oxalic acid in 5 ml. of methanol. The precipitated crystals are collected by filtration whereby 1.6 g. of 1-1-(3,4,5-trimethoxybenzyl)-6,7-diisobutyryloxy - 1,2,3,4-tetrahydroisoquinoline oxalate is obtained. The crystals are recrystallized from methanol to yield said oxalate as fine needles melting at 202–204° C.

*Elemental analysis.*—Calcd. for $C_{27}H_{35}O_7N \cdot C_2H_2O_4$ (percent): C, 60.51; H, 6.48; N, 2.43. Found (percent): C, 60.35; H, 6.47; N, 2.38.

EXAMPLE 10

2.0 g. of 1-1-(3,4,5-trimethoxybenzyl)-6,7-dihydroxy-1,2,3,4 - tetrahydroisoquinoline hydrochloride is suspended in 20 ml. of chloroform. Dry hydrogen chloride gas is introduced into the suspension. The suspension is then mixed with 2.8 g. of propionyl chloride and stirred for about 20 hours at room temperature. The reaction mixture is concentrated to dryness under reduced pressure. The residue thus obtained is dissolved in water and the solution is neutralized with sodium bicarbonate. The solution is extracted with chloroform. The extract is washed with water, dried and evaporated to remove solvent. The resulting oil is dissolved in 20 ml. of methanol solution containing 630 mg. of oxalic acid. The precipitated crystals are collected by filtration and recrystallized from methanol to yield 1.58 g. of 1-1-(3,4,5-trimethoxybenzyl)-6,7-dipropionyloxy-1,2,3,4-tetrahydroisoquinoline oxalate. M.P. 209–211° C. (decomp.).

*Elemental analysis.*—Calcd. for $C_{25}H_{31}O_7N \cdot C_2H_2O_4$ (percent): C, 59.22; H, 6.08; N, 2.56. Found (percent): C, 59.33; H, 6.10; N, 2.71.

What is claimed is:

1. A compound represented by the formula:

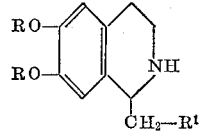

wherein R represents a lower alkanoyl radical and $R^1$ represents a trimethoxyphenyl radical, and pharmaceutically acceptable acid addition salts thereof.

2. 1 - (3,4,5 - trimethoxybenzyl) - 6,7 - di-lower alkanoyloxy - 1,2,3,4 - tetrahydroisoquinoline and pharmaceutically acceptable acid addition salts thereof.

3. A compound as in claim 2 wherein di-lower alkanoyloxy is dibutyryloxy.

4. A compound as in claim 2 wherein di-lower alkanoyloxy is diisobutyryloxy.

5. A compound as in claim 2 wherein di-lower alkanoyloxy is diacetyloxy.

6. A compound as in claim 2 wherein di-lower alkanoyloxy is dipropionyloxy.

(References on following page)

References Cited

UNITED STATES PATENTS

| | | | |
|---|---|---|---|
| 2,683,146 | 7/1954 | Robinson | 260—286 |
| 3,497,510 | 2/1970 | Mashimo | 260—289 X |
| 3,557,122 | 1/1971 | Shavel | 260—289 |

OTHER REFERENCES

Iwa, Jap. Jour. Pharmacy, vol. 17, pp. 143–52 (1967).

DONALD G. DAUS, Primary Examiner

U.S. Cl. X.R.

260—287 R; 424—258